US009582993B2

(12) United States Patent
Huang et al.

(10) Patent No.: US 9,582,993 B2
(45) Date of Patent: Feb. 28, 2017

(54) HOME APPLIANCE, CONTROL DEVICE THEREOF, AND METHOD OF ASSEMBLING THE CONTROL DEVICE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW); Kuan-Chou Lin, Taichung (TW); Yu-Chin Tsai, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 0 days.

(21) Appl. No.: 14/745,332

(22) Filed: Jun. 19, 2015

(65) Prior Publication Data

US 2016/0371970 A1 Dec. 22, 2016

(51) Int. Cl.
*G05B 11/01* (2006.01)
*G08C 19/16* (2006.01)
*G08C 17/02* (2006.01)

(52) U.S. Cl.
CPC .................................... *G08C 17/02* (2013.01)

(58) Field of Classification Search
CPC ...................................................... G08C 17/02
See application file for complete search history.

(56) References Cited

U.S. PATENT DOCUMENTS 5,793,300 A * 8/1998 Suman ............... G07C 9/00182 340/12.29
2002/0190956 A1* 12/2002 Klein .................... G06F 1/1626 345/169
2004/0235519 A1* 11/2004 Frielink ................ G06F 1/1616 455/557
2009/0327727 A1* 12/2009 Meijer .................... G06F 21/31 713/170
2010/0327766 A1* 12/2010 Recker ...................... H02J 9/02 315/291
2014/0169795 A1* 6/2014 Clough ............... G06F 19/3418 398/106
2014/0177692 A1* 6/2014 Yu ............................ H04B 3/46 375/224

(Continued)

*Primary Examiner* — Erin File

(74) *Attorney, Agent, or Firm* — Ming Chow; Sinorica, LLC

(57) ABSTRACT

A home appliance includes a controlled assembly, a control module, and a signal converter. The control module is electrically connected to the controlled assembly, and the control module has a port for receiving an electrical signal. The control module controls the controlled assembly according to the electrical signal received through the port. The signal converter receives a wireless control signal, and converts the wireless control signal into the electrical signal to be transmitted to the port. The signal converter is selected from a plurality of signal converters which respectively convert signals of different types. While assembling, the signal converter is connected to the port, which makes the control module and the connected signal converter constitute a control device of the home appliance. Whereby, the inventory pressure of control devices can be reduced for manufacturers.

3 Claims, 4 Drawing Sheets

(56) References Cited

U.S. PATENT DOCUMENTS

| | | | | | |
|---|---|---|---|---|---|
| 2014/0340075 | A1* | 11/2014 | Doi | G01D 4/002 | 324/113 |
| 2015/0264784 | A1* | 9/2015 | Romano | H05B 33/0872 | 315/158 |
| 2015/0368566 | A1* | 12/2015 | Young | F25J 3/0209 | 700/273 |
| 2016/0054717 | A1* | 2/2016 | Elberbaum | H02G 3/18 | 700/275 |
| 2016/0094702 | A1* | 3/2016 | Ariel | A63F 13/86 | 455/420 |
| 2016/0139574 | A1* | 5/2016 | Lee | H04L 12/2836 | 700/275 |

* cited by examiner

HOME APPLIANCE, CONTROL DEVICE THEREOF, AND METHOD OF ASSEMBLING THE CONTROL DEVICE

BACKGROUND OF THE INVENTION

1. Technical Field

The present invention relates generally to controlling home appliances, and more particularly to a home appliance, a control device thereof, and a method of assembling the control device.

2. Description of Related Art

Remote-controllable home appliances can be controlled from a distance away from their located positions, which enhances convenience in modern people's daily life. The control device of a conventional home appliance includes a control circuit and a wireless signal receiving circuit fixedly connected to the control circuit, wherein the control circuit controls other controlled assemblies of the home appliance according to wireless control signals, which are sent from a remote control and received by the wireless signal receiving circuit. The controlled assemblies described herein are assemblies which can operate under control. For example, controlled assemblies in an air conditioner include a compressor, a fan, and other components.

Generally, one wireless signal receiving circuit only receives one type of wireless signals. In other words, if a wireless signal receiving circuit is designed for receiving radio frequency signals, it would not be capable of receiving other types of wireless signals, such as infrared, Bluetooth, and Wi-Fi.

For a manufacturer of home appliances, the current way to deal with the various types of wireless signals is to also develop various types of control devices, and each type of control devices corresponds to one specific type of wireless signals respectively. While manufacturing home appliances on demand of clients, only those capable of receiving the required type of wireless signals will be selected; on the contrary, other types of control devices will be left unused. The inventory pressure of the manufacturer may be increased as a result, for some types of control devices may not be selected for quite a long of time.

BRIEF SUMMARY OF THE INVENTION

In view of the above, the primary objective of the present invention is to provide a home appliance, a control device of the home appliance, and a method of assembling the control device to effectively reduce the inventory pressure of control devices for manufacturers of home appliances.

The control device provided in the present invention controls at least one controlled assembly of a home appliance, and includes a control module and a signal converter. The control module is electrically connected to the at least one controlled assembly, wherein the control module has a port for receiving an electrical signal; the control module controls the at least one controlled assembly to perform a corresponding operation according the received electrical signal. The signal converter is detachably connected to the port, wherein the signal converter receives a wireless control signal, and converts the wireless control signal into the electrical signal which is transmitted to the port.

The home appliance provide in the present invention includes at least one controlled assembly, a control module, and a signal converter. The control module is electrically connected to the at least one controlled assembly, wherein the control module has a port for receiving an electrical signal; the control module controls the at least one controlled assembly to perform a corresponding operation according the received electrical signal. The signal converter is detachably connected to the port, wherein the signal converter receives a wireless control signal, and converts the wireless control signal into the electrical signal which is transmitted to the port.

The present invention further provides a method of assembling a control device of a home appliance, wherein the home appliance comprises at least one controlled assembly, the at least one controlled assembly is controllable to perform specific operations. The method includes the following steps: a) electrically connect a control module to the at least one controlled assembly, wherein the control module has a port for receiving an electrical signal; the control module controls the at least one controlled assembly to perform a corresponding operation according the received electrical signal; b) provide a plurality of signal converters, each of which converts a wireless control signal of different types into the electrical signal; and c) connect one of the signal converters to the port. Whereby, the control module and the connected signal converter constitute the control device.

Whereby, in spite of the various types of wireless signals, one single kind of home appliance may only require one type of control modules to be made. After connecting one of the signal converters corresponding to the required specific type of wireless signal to the control module, the assembling process of the control device is then completed. In this way, the inventory pressure of control devices for manufactures can be effectively reduced.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
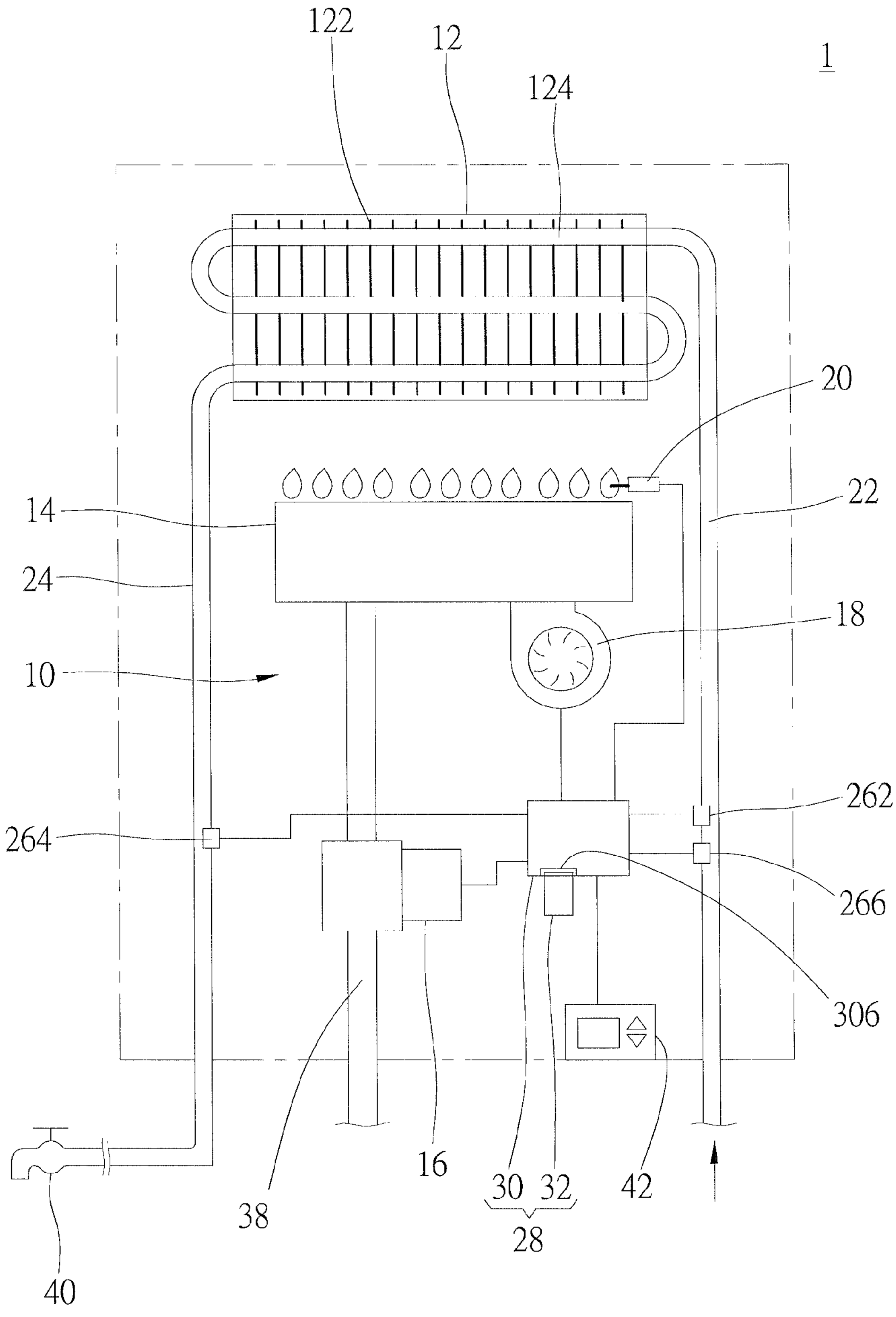
FIG. 1 is a schematic diagram of the home appliance of a first preferred embodiment of the present invention.
Figure 2:
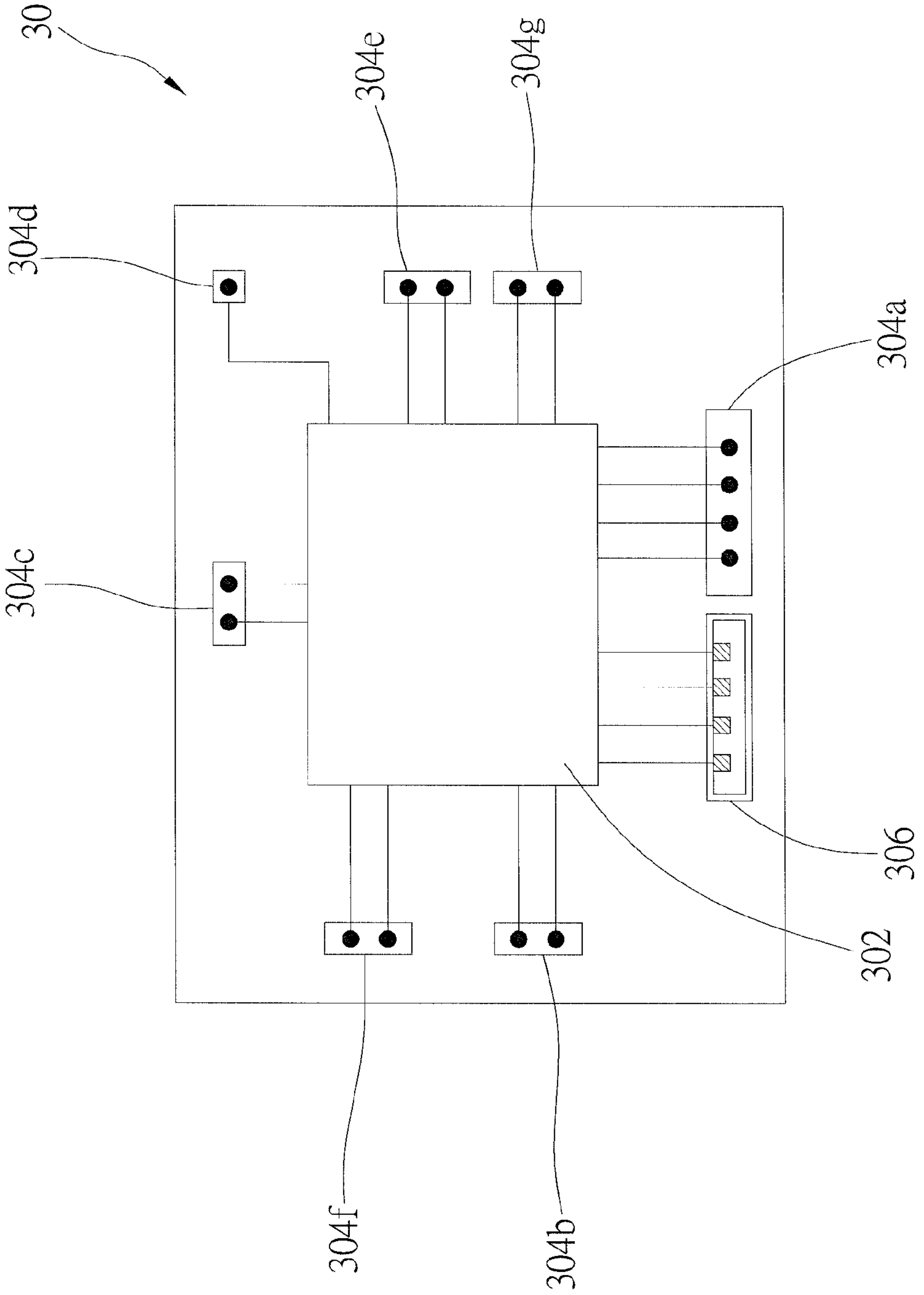
FIG. 2 is a schematic diagram of the control module of the first preferred embodiment of the present invention.

As shown in FIG. 1, a home appliance of the first preferred embodiment of the present invention is a gas water heater 1, which includes a heating unit 10, an inlet pipe 22, an outlet pipe 24, a plurality of detectors 262, 264, 266, and a control device 28.

The heating unit 10 includes a heat exchanger 12, a burner 14, a gas valve 16, a blower 18, and an ignition sense pin 20. The heat exchanger 12 has a plurality of heat-absorbing sheets 122 and a water transmission pipe 124 passing through the heat-absorbing sheets 122. The burner 14 is located below the heat exchanger 12 to burn gas to heat the heat exchanger 12.

The gas valve 16 ad the blower 18 are controlled assemblies of the first preferred embodiment, which respectively perform corresponding operations under control.

The gas valve 16 is provided on a gas pipeline 38 which communicates the burner 14, and is controllable to adjust the amount of gas supplied to the burner 14. The blower 18 communicates the burner 14, and is controllable to change the speed of a motor to regulate the amount of air supplied to the burner 14. The ignition sense pin 20 is located near the burner 14 to generate sparks to ignite gas flown out from a gas outlet of the burner 14, and to sense flame generated by the burner 14.

The inlet pipe 22 and the outlet pipe 24 respectively communicate the water transmission pipe 124 of the heat exchanger 12, wherein water flows into the inlet pipe 22, flows through the water transmission pipe 124, and then flows out from the outlet pipe 24. The outlet pipe 24 is connected to a faucet 40. The detectors 262, 264, 266 respectively detect the water temperature at the inlet pipe 22, the water temperature at the outlet pipe, and the amount of water flowing through the inlet pipe 22.

The control device 28 includes a control module 30, which includes a control circuit 302, a plurality of first ports 304*a*-304*g*, and a second port 306, wherein the first ports 304*a*-304*g* and the second port 306 are electrically connected to the control circuit 302. The first ports 304*a*-304*g* are electrically connected to a control unit 42, the gas valve 16, the blower 18, the ignition sense pin 20, and the detectors 262, 264, 266 respectively. In practice, the first ports 304*a*-304*g* and the second port 306 are connected to other components thought connectors, plugs, or slots. The control unit 42 is provided for a user to input a demanded temperature. After the faucet 40 is turned on, the control circuit 302 controls the gas valve 16 and the blower 18 to make the water at the outlet pipe 24 reach the demanded temperature according to the water temperatures and the amount of water measured by the detectors 262, 264, 266.

Figure 3:
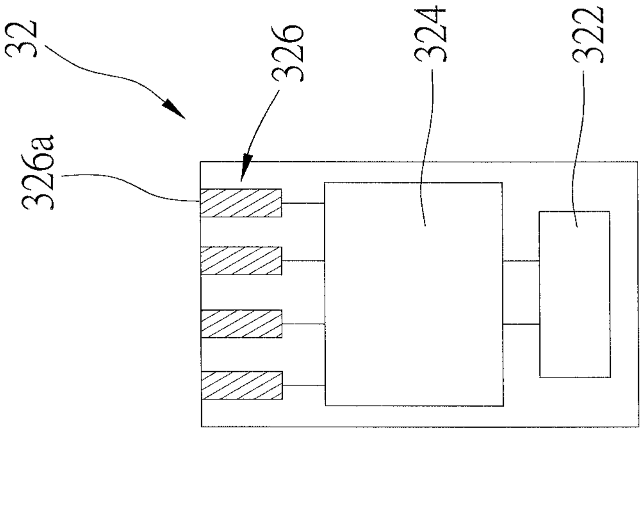
FIG. 3 is a schematic diagram of the first signal converter of the first preferred embodiment of the present invention.
Figure 4:
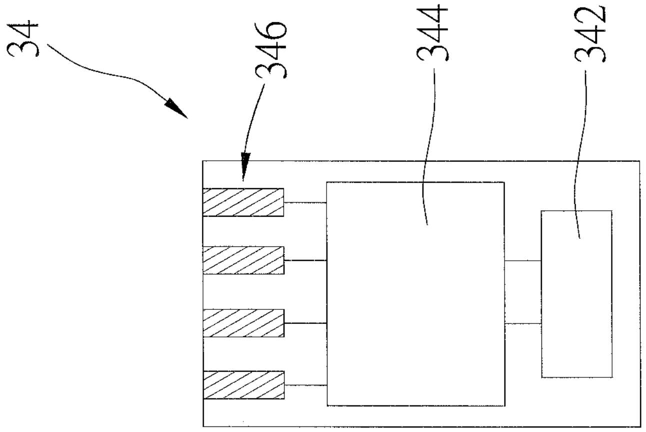
FIG. 4 is a schematic diagram of the second signal converter of the first preferred embodiment of the present invention.
Figure 5:
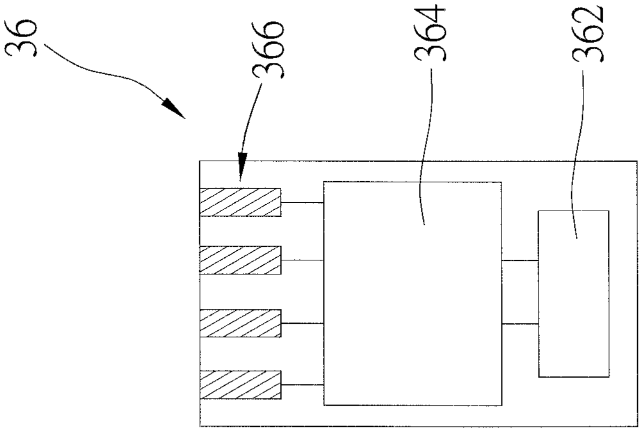
FIG. 5 is a schematic diagram of the third signal converter of the first preferred embodiment of the present invention.

In order to make the gas water heater 1 remote-controllable with wireless signals from outside, in addition to the control module 30, the water heater of the first preferred embodiment is further provided with a first, a second, and a third signal converters 32, 34, 36, as shown in FIG. 3 to FIG. 5. These signal converters 32, 34, 36 respectively convert wireless signals of different types into electrical signals of a same type.

The first signal converter 32 includes a first receiving circuit 322, a first converting circuit 324, and a first connection interface 326, which are provided on a same circuit board, wherein the first receiving circuit 322 receives radio frequency (RF) wireless control signals, the first converting circuit 324 is electrically connected to the first receiving circuit 322 and the first connection interface 326, and the first connection interface 326 has a plurality of pads 326*a* in the first preferred embodiment to correspond to the second port 306 of the control module 30. The first converting circuit 324 converts the RF wireless control signals received by the first receiving circuit 322 into corresponding electrical signals, and transmits the electrical signals to the pads 326*a* of the first connection interface 326.

The second and the third signal converters 34, 36 have almost the same structures with the first signal converter 32, except that the second receiving circuit 342 of the second signal converter 34 receives infrared wireless control signals, which are converted into electrical signals by the second converting circuit 344, wherein the electrical signals are transmitted to the second connection interface 346; the third receiving circuit 362 of the third signal converter 36 receives Bluetooth wireless control signals, which are converted into electrical signals by the third converting circuit 364, wherein the electrical signals are transmitted to the third connection interface 366. The first, the second, and the third connection interfaces 326, 346, 366 are structurally the same, and correspond to the second port 306 of the control module 30.

For example, as shown in FIG. 1, once the first connection interface 326 of the first signal converter 32 is electrically connected to the second port 306, an external device, such as a wireless RF remote control, can transmit a wireless control signal which contains the demanded temperature to the first signal converter 32, and then the first signal converter 32 converts the received wireless control signal into a corresponding electrical signal, which is transmitted to the control circuit 302 via the second port 306. Accordingly, after the faucet 40 is turned on, the control circuit 302 controls the ignition sense pin 20 to ignite, and controls the gas valve 16 and the blower 18 to make the gas water heater 1 provide hot water as the demanded temperature. Similarly, once the second signal converter 34 or the third signal converter 36 are connected to the second port 306 of the control module 30, the gas water heater 1 would be capable of receiving infrared wireless control signals or Bluetooth wireless control signals.

In this way, while the manufacturer of the gas water heater 1 is assembling the control device 28, they may connect the signal converter which corresponds to the signal type required by clients to the second port 306 of the control module 30. Whereby, the control module 30 and the connected signal converter together constitute the control device 28 which provides the wireless control function.

The aforementioned signal converters 32, 34, 36 are merely explanatory examples, and are not limitations of the present invention. In practice, signal converters can also be compatible with ZigBee, Wi-Fi, 3G, 4G, or 5G wireless control signals.

Figure 6:
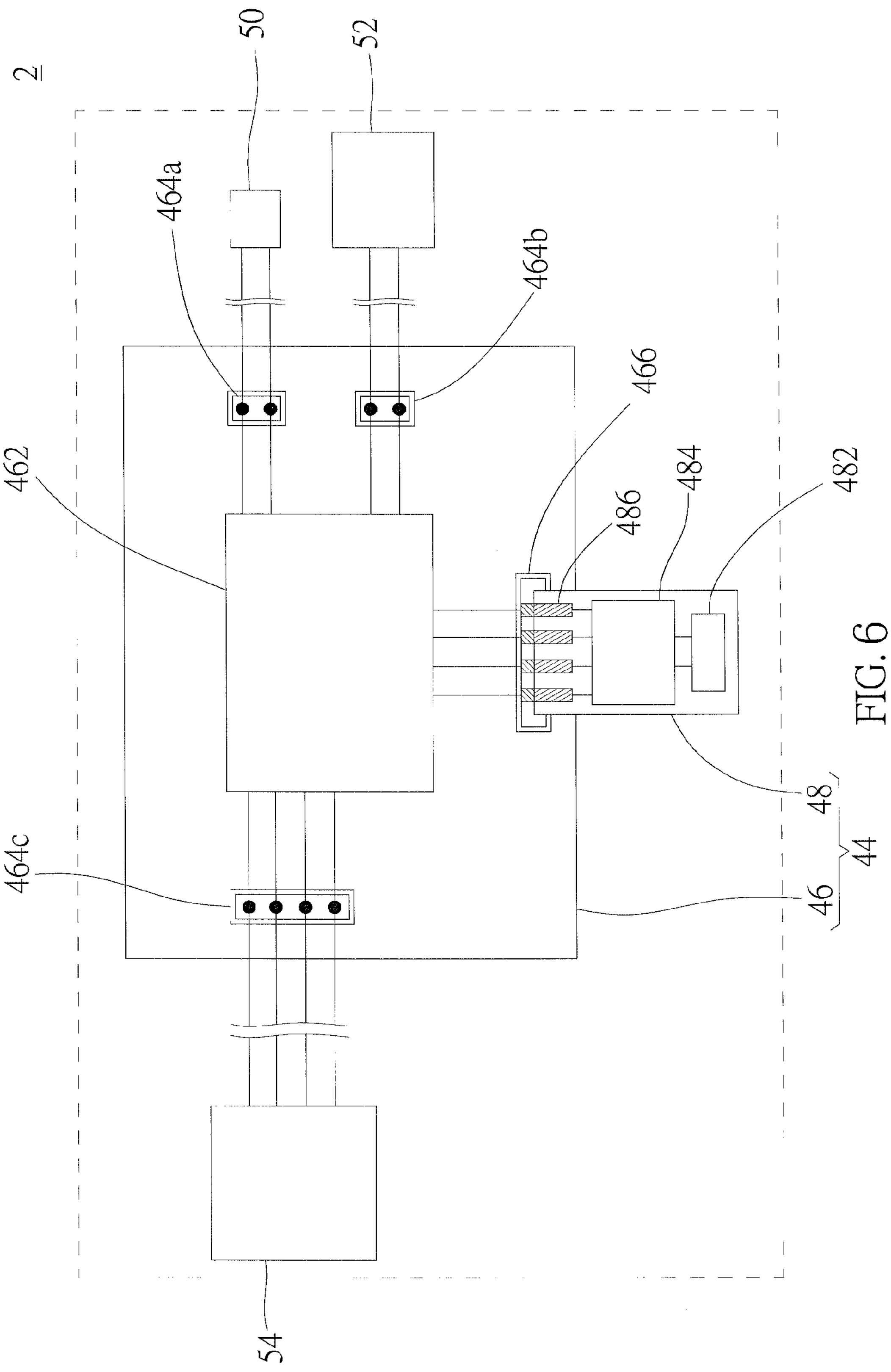
FIG. 6 is a schematic diagram of the home appliance of a second preferred embodiment of the present invention.

As shown in FIG. 6, a home appliance of the second preferred embodiment of the present invention is an air conditioner 2, which includes a control device 44, a temperature sensor 50, a fan 52, and a compressor 54. The control device 44 includes a control module 46 and a signal converter 48, wherein the control module 46 has a control circuit 462, a plurality of first ports 464*a*-464*c*, and a second port 466. The first ports 464*a*-464*c* and the second port 466 are electrically connected to the control circuit 462. The first ports 464*a*-464*c* are electrically connected to the temperature sensor 50, the fan 52, and the compressor 54 respectively, wherein the fan 52 and the compressor 54 are controlled assemblies of the second preferred embodiment.

The signal converter 48 is detachably connected to the second port 466, wherein the signal converter 48 includes a receiving circuit 482, a converting circuit 484, and a connection interface 486, wherein the receiving circuit 482 receives RF wireless control signals, and the converting circuit 484 converts the received wireless control signals into corresponding electrical signals, and then transmits the electrical signals to the connection interface 486. The signal converter 48 is selected from different types of signal converters corresponding to different types of wireless signals to meet the manufacturing requirement. The signal converters described herein have similar operational design with the first to the third signal converters 32, 34, 36 of the first preferred embodiment, and therefore are not described in detail.

Whereby, the signal converter 48 receives RF wireless control signals sent from an external device, and converts the wireless control signals into corresponding electrical signals to be transmitted to the control circuit 462. The control circuit 462 controls the fan 52 or the compressor 54 to change air volume or air temperature of the air conditioner 2 accordingly.

In summary, with the method of assembling the control device of the home appliance provided in the present application, a manufacturer of home appliances only needs to manufacture one single type of control module for one single kind of home appliance. Various types of control devices corresponding to different types of wireless control signals can be assembled by connecting different signal converters. As a result, the inventory pressure of control devices for manufacturers of home appliances may be effectives reduced, and the manufacturing methods of control devices may have more flexibility now.

It must be pointed out that the embodiments described above are only some preferred embodiments of the present invention. All equivalent structures or methods which employ the concepts disclosed in this specification and the appended claims should fall within the scope of the present invention.

What is claimed is:

1. A control device controlling at least one controlled assembly of a home appliance, the control device comprising:
- a control module electrically connected to the at least one controlled assembly;
- the control module having a port for receiving an electrical signal;
- the control module controlling the at least one controlled assembly to perform a corresponding operation according the received electrical signal;
- a plurality of signal converters provided for receiving different wireless control signals and having connection interfaces of same structure;
- one of the signal converters being detachably connected to the port;
- the signal converter which is connected to the port converting the wireless control signal into the electrical signal which is transmitted to the port;
- each of the signal converters further comprising a receiving circuit and a converting circuit;
- the receiving circuit, the converting circuit and the connection interface being electrically connected in series;
- the receiving circuit of the signal converter which is connected to the port receiving the wireless control signal;
- the converting circuit of the signal converter which is connected to the port converting the wireless control signal received by the receiving circuit into the electrical signal and transmitting the electrical signal to the connection interface of the signal converter which is connected to the port; and
- the connection interface of the signal converter which is connected to the port being electrically connected to the port.

2. A home appliance comprising:
- at least one controlled assembly;
- a control module electrically connected to the at least one controlled assembly;
- the control module having a port for receiving an electrical signal;
- the control module controlling the at least one controlled assembly to perform a corresponding operation according the received electrical signal;
- a plurality of signal converters provided for receiving different wireless control signals and having connection interfaces of same structure;
- one of the signal converters being detachably connected to the port;
- the signal converter which is connected to the port converting the wireless control signal into the electrical signal which is transmitted to the port;
- each of the signal converters further comprising a receiving circuit and a converting circuit;
- the receiving circuit, the converting circuit and the connection interface being electrically connected in series;
- the receiving circuit of the signal converter which is connected to the port receiving the wireless control signal;
- the converting circuit of the signal converter which is connected to the port converting the wireless control signal received by the receiving circuit into the electrical signal and transmitting the electrical signal to the connection interface of the signal converter which is connected to the port; and
- the connection interface of the signal converter which is connected to the port being electrically connected to the port.

3. A method of assembling a control device of a home appliance, the home appliance comprising at least one controlled assembly, the at least one controlled assembly being controllable to perform specific operations, the method comprising the steps of:
- electrically connecting a control module to the at least one controlled assembly;
- the control module having a port for receiving an electrical signal;
- the control module controlling the at least one controlled assembly to perform a corresponding operation according the received electrical signal;
- providing a plurality of signal converters for converting a wireless control signal of different types into the electrical signal;
- the plurality of signal converters having connection interfaces of same structure;
- the connection interface of each of the signal converters being for connecting to the port of the control module;
- choosing one of the signal converters and connecting the chosen signal converter to the port;
- the control module and the connected signal converter constituting the control device;
- each of the signal converters further comprising a receiving circuit and a converting circuit;
- the receiving circuit, the converting circuit and the connection interface being electrically connected in series;
- the receiving circuit of the signal converter which is connected to the port receiving the wireless control signal;
- the converting circuit of the signal converter which is connected to the port converting the wireless control signal received by the receiving circuit into the electrical signal and transmitting the electrical signal to the connection interface of the signal converter which is connected to the port; and the connection interface of the signal converter which is connected to the port being electrically connected to the port.

* * * * *